(12) United States Patent
Grandblaise et al.

(10) Patent No.: US 8,311,007 B2
(45) Date of Patent: Nov. 13, 2012

(54) RADIO RESOURCE MANAGEMENT

(75) Inventors: David Grandblaise, Paris (FR);
Roberta Fracchia, Paris (FR); Remy Pintenet, Le Mesnil le Roi (FR)

(73) Assignee: Motorola Solutions, Inc., Schaumburg, IL (US)

( * ) Notice: Subject to any disclaimer, the term of this patent is extended or adjusted under 35 U.S.C. 154(b) by 346 days.

(21) Appl. No.: 12/679,337

(22) PCT Filed: Sep. 2, 2008

(86) PCT No.: PCT/US2008/075054
§ 371 (c)(1),
(2), (4) Date: Mar. 22, 2010

(87) PCT Pub. No.: WO2009/042360
PCT Pub. Date: Apr. 2, 2009

(65) Prior Publication Data
US 2010/0220676 A1    Sep. 2, 2010

(30) Foreign Application Priority Data

Sep. 26, 2007   (GB) .................................. 0718695.0

(51) Int. Cl.
*H04W 4/00*     (2009.01)
(52) U.S. Cl. ...................... 370/329; 455/403; 455/422.1; 455/436; 455/440; 455/450
(58) Field of Classification Search .......... 370/310–350; 455/440, 450–454
See application file for complete search history.

(56) References Cited

U.S. PATENT DOCUMENTS

| 2003/0103496 A1* | 6/2003 | Lakshmi Narayanan et al. ............................ 370/352 |
| 2006/0198361 A1 | 9/2006 | Chen et al. |
| 2007/0072614 A1 | 3/2007 | Forsberg |

(Continued)

FOREIGN PATENT DOCUMENTS

EP    1742427 A2    1/2007

(Continued)

OTHER PUBLICATIONS

Hall, Nigel: Patents ACT 1977: Search Report Under Section 17, Patents Directorate, UK Intellectual Property Office, Cardiff Road, Newport South Wales, NP10 8QQ, Jan. 31, 2008, 4 pages.

(Continued)

*Primary Examiner* — Charles C Jiang
(74) *Attorney, Agent, or Firm* — Barbara R. Doutre; Lalita Pace

(57) ABSTRACT

A wireless communication unit (101) for a radio communication system comprises a device token controller (403) which receives at least a first geographical radio resource token allocated to the wireless communication unit (101) by a radio resource token controller (117) of a network of the radio communication system. The first geographical radio resource token provides a first radio resource right allocation to the wireless communication unit (101) for a first geographical area. A radio resource manager (407) then determines a radio resource usage parameter in response to the first radio resource right allocation. Specifically, the radio resource manager (407) may only determine the radio resource usage parameter in response to the first radio resource right allocation if the location estimate is within the first geographical area. The radio communication system may be a heterogeneous communication system. The invention may allow effective overall centralized radio resource management while allowing distributed radio resource management procedures and techniques to be used.

21 Claims, 8 Drawing Sheets

U.S. PATENT DOCUMENTS

2007/0255793 A1* 11/2007 Kwon et al. .................. 709/206

FOREIGN PATENT DOCUMENTS

| EP | 1742497 B1 | 10/2008 |
|---|---|---|
| WO | 02-085055 A2 | 10/2002 |
| WO | 2004-081732 A2 | 9/2004 |
| WO | 2007-071009 A1 | 6/2007 |
| WO | 2007073267 A1 | 6/2007 |

OTHER PUBLICATIONS

Yun Bae Kim, "Corresponding Application PCT/US2008/075054—PCT International Search Report and Written Opinion," WIPO, ISA/KR, Korean Intellectual Property Office, Daejeon, Republic of Korea, Mar. 16, 2009, 11 pages, most relevant pp. 7-8 and 10-11.

Yoshiko Kuwahara, "Corresponding Application PCT/US2008/075—PCT International Preliminary Report on Patentability," The International Bureau of WIPO, Geneva, Switzerland, Apr. 8, 2010, 6 pages, most relevant pp. 2, 5-6.

Stine, John A.: "A Location-Based Method for Specifying RF Spectrum Rights", New Frontiers in Dynamic Spectrum Access Networks, 2007, DySPAN 2007, 2nd IEEE International Symposium on, Apr. 17-20, 2007, published Jun. 4, 2007, pp. 34-45.

\* cited by examiner

RADIO RESOURCE MANAGEMENT

FIELD OF THE INVENTION

The invention relates to radio resource management and in particular, but not exclusively, to radio resource management in a heterogeneous radio communication system.

BACKGROUND OF THE INVENTION

In the last decades, wireless communication systems have become ubiquitous. For example, cellular communication systems such as mobile communication systems (e.g. the Global System for Mobile communication (GSM) or the Universal Mobile Telecommunication System (UMTS)), broadband Wireless Metropolitan Area Networks (WMAN) and wireless Local Area Networks (WLANs) have become widespread as a means to provide efficient communication services to e.g. mobile communication units. However, the increased prevalence of wireless communication systems have resulted in a dramatically increased need for air interface resources, and the need for efficiently and flexibly utilising the available resource has become essential for the further development of wireless systems.

Accordingly, radio resource management is one of the most critical operations in a radio communication system and has become increasingly difficult due to the existence of an increasing number of diverse and interoperating communication systems. For example, intersystem handovers of communications between different systems have been introduced for multi system devices in order to provide an improved communication service and more efficient radio resource usage. However, as each of the communication systems typically apply individual resource management, it is difficult to achieve an efficient overall resource management for the combined operation of the individual communication systems.

In traditional radio communication systems, the resource management is typically performed by central network elements (such as a Radio Network Controller (RNC) for a UMTS cellular communication system) taking into account only the conditions and characteristics of the individual communication system. It is typically difficult and cumbersome to modify such centralized resource management to allow efficient resource management and resource sharing between different communication systems. Specifically, such modifications can result in inflexible, cumbersome, inefficient and/or impractical resource sharing.

For example, it is very difficult to introduce inter system resource management functionality which allows an efficient yet low complexity control of parameters such as load balancing, access right management, inter system handover, resource re-allocation etc. Also, in many communication systems, and especially heterogeneous communication systems, the management of geographic resource distribution, management and control is very complex and difficult to optimize.

Hence, an improved radio resource management approach would be advantageous, and in particular a radio resource management approach providing increased flexibility, facilitated implementation, reduced complexity, reduced cost, improved resource sharing, improved intersystem radio resource management in a heterogeneous system, improved user experience, improved and/or facilitated geographical radio resource management, increased capacity and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a wireless communication unit for a radio communication system, the wireless communication unit comprising: means for receiving at least a first geographical radio resource token allocated to the wireless communication unit by a radio resource token controller of a network of the radio communication system, the first geographical radio resource token providing a first radio resource right allocation to the wireless communication unit for a first geographical area; and radio resource means for determining a radio resource usage parameter in response to the first radio resource right allocation.

The invention may provide improved radio resource management in a radio communication system. In particular, the invention may provide a practical and/or flexible way of controlling, managing and/or optimizing overall radio resource performance centrally while allowing distributed radio resource management, and in particular allowing the individual wireless communication units to perform detailed radio resource usage decisions. Thus, reduced complexity may be achieved. The invention may allow an easy to implement and/or efficient adaptation of radio resource management to individual geographic areas.

The invention may in particular be advantageous for heterogeneous radio communication systems comprising a plurality of different communication systems. The invention may improve radio resource management across different communication systems and may in particular allow an efficient, flexible and/or facilitated means of controlling (including managing, constraining and/or optimizing) radio resource interactions or operation that affects more than one communication system. The invention may allow easy introduction of additional radio resource management functionality (such as cross-system resource management) to existing systems. For example, the invention may provide an additional radio resource management layer that easily fits with existing radio resource management operations in the individual systems of the heterogeneous communication system.

The invention may facilitate the introduction of new radio communication systems and/or technologies to existing systems.

The invention may in particular allow an efficient way of enabling some distributed radio resource management while ensuring a centralised control of the management thereby e.g. ensuring the reliability and performance of the provided communication services.

The network may be a central network/fixed network/backhaul network/infrastructure network of the communication system. The radio resource token controller may be located in an access point, base station, network entity or in an interconnecting network interconnecting the access points and/or base stations.

The first geographical area may be defined in or by the first geographical radio resource token and/or may e.g. be a predetermined geographical area and/or may be communicated to the wireless communication unit independently of the first geographical radio resource token.

In some embodiments, the first geographical radio resource token may be dynamically allocated to the wireless communication unit. In some embodiments, the first geographical radio resource token may be permanently allocated to the wireless communication unit during a time interval exceeding, e.g. one day.

In some embodiments, the first geographical area is different than a cell coverage area. Thus, the first geographical area may not be identical to a cell coverage for the cell covering the first geographical area. For example, in some cases the geographical area may be smaller than the cell coverage area (e.g. it may be a small subset of one cell). In other cases the geographical area may be larger than a cell coverage area (e.g. it may comprise at least one cell and extend into a different cell). Thus, the first coverage area may be independent of cell coverage areas. This may allow an improved flexibility in managing radio resource in different geographical locations.

The invention may in particular provide improved geo (graphical) location radio resource management. Geo-location based radio resource management can be based on geo-location techniques for the radio equipments. The geo-location based techniques can be equipment enabled (GPS, Galileo like) or network assisted (e.g. triangulation).

According to another aspect of the invention, there is provided a method of radio resource management for a wireless communication unit for a radio communication system, the method comprising: receiving at least a first geographical radio resource token allocated to the wireless communication unit by a radio resource token controller of a network of the heterogeneous radio communication system, the first geographical radio resource token providing a first radio resource right allocation to the wireless communication unit for a first geographical area; and determining a radio resource usage parameter in response to the first radio resource right allocation.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a heterogeneous communication system comprising a plurality of communication systems using different standards, technologies and/or which are managed by different operators. However, it will be appreciated that the invention is not limited to this application but may be applied to many other communication systems including for example homogeneous cellular communication systems, Wireless Local Area Networks (WLANs), or Wireless Metropolitan Wireless Networks (WMANs).

Figure 1:
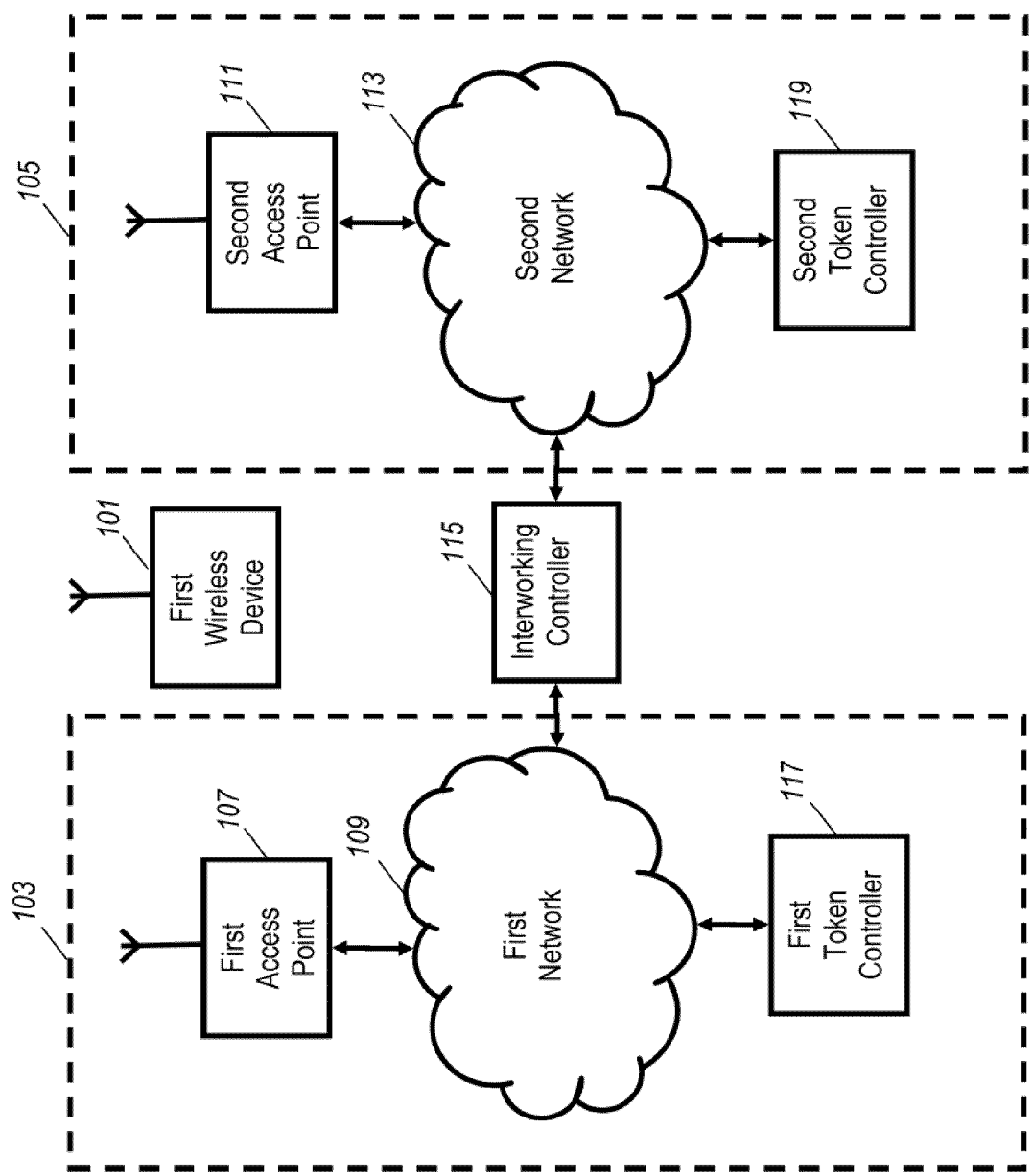
FIG. 1 illustrates an example of a heterogeneous communication system in accordance with some embodiments of the invention.

FIG. 1 illustrates an example of a heterogeneous communication system in accordance with some embodiments of the invention. The communication system comprises a plurality of multi-system wireless communication units of which a first wireless device 101 is illustrated in FIG. 1. The wireless communication units may be any entity capable of communicating over the air interface of a communication system including for example a user equipment, a subscriber unit, a remote terminal, a mobile terminal, a mobile phone, etc. In the example, the first wireless device 101 is a multi-mode terminal capable of communicating with different communication systems and using different communication technologies and standards and/or different bands (multi-bands). For example, the first wireless device 101 may be capable of communicating with a cellular communication system such as UMTS, a WMAN communication system such as WiMAX, a WLAN communication system such as an IEEE 802.11x communication system etc.

In the illustrated example, the heterogeneous communication system comprises a first and second (sub)communication system which operates in accordance with different Technical Specifications, use different air interface technologies and are managed and operated by different operators. Thus, the two communication systems are predominantly independent communication systems which may support remote terminals independently of each other.

E.g. a single mode/technology wireless communication unit may be fully supported by one of the two communication systems 103, 105.

In the specific example, the first communication system 103 is a cellular UMTS cellular communication system and the second communication system 105 is an 802.11x WLAN. In other examples, the first communication system 103 may e.g. be a WMAN communicating in accordance with e.g. WiMAX™ Technical Specifications. The first wireless device 101 is a multi-mode device which comprises functionality for communicating in accordance with both UMTS Technical Specifications and 802.11x WLAN Technical Specifications.

The first communication system 103 comprises a plurality of access points in the form of base stations. For brevity and clarity, FIG. 1 illustrates only a first access point/base station 107 of the first communication system 103. The first access point 107 is coupled to a first network 109 which is the infrastructure/fixed network of the UMTS communication system. The first network 109 comprises a radio access network (to which the first access point 107 may be considered to belong) and a core network of the UMTS cellular communication system and comprises functionality for interconnecting the base stations, routing data from one part of the RAN to another, interfacing with other communication systems, allocating air interface resources and perform many of the operation and management functions of a cellular communication system, as will be well known to the person skilled in the art.

The second communication system 105 comprises a plurality of access points of which only one (the second access point 111) is shown. The second access point 111 is connected to a second network 113 which is arranged to interconnect access points of the second communication system 105, interface with other communication systems, allocate air interface resources and perform many of the operation and management functions of a WLAN communication system, as will be well known to the person skilled in the art.

In the example, the first communication system 103 may support UMTS only devices and the second communication system 105 may support WLAN only devices. However, in addition, both the first communication system 103 and the second communication system 105 may interwork to support multi-mode devices such as the first wireless device 101. For example, the first wireless device 101 may be allowed to handover an active communication from the first access point 107 to the second access point 111 thereby handing over from the UMTS communication system 103 to the WLAN communication system 105.

In the example, the communication system comprises an interworking controller 115 which is arranged to support this interworking and to allow information exchange between the communication systems. It will be appreciated that although the interworking controller 115 is illustrated as a separate entity external to the systems 103, 105 it may be implemented fully or partially by interworking functions in network elements of the individual systems 103, 105.

In the system of FIG. 1, inter system radio resource management is partially or fully optimised and controlled by the use of geographical radio resource tokens where each token provides a radio resource right allocation in a geographical area. In the system, a wireless communication unit that receives a token thus has a right (including a set of rights) to adjust the radio resource usage of the wireless communication unit in accordance with this right when the wireless communication unit is within the given geographical area.

The decision of how, when and if to use the allocated radio resource right can be made by the wireless communication unit itself. For example, the radio resource right may be a right to use a specific radio resource (e.g. a frequency-time allocation) and the wireless communication units may individually decide whether they will attempt to use any specific radio resource right or not. For example, the wireless communication unit may use cognitive radio techniques that monitor current interference levels and may use the allocated frequency time allocation if it has a communication requirement and the measured interference is below a given limit. However, if the wireless communication unit has not been allocated a token, the wireless communication unit cannot proceed to use the resource allocation even if the measured interference is low (or can only use it to a lesser extent e.g. a minimum resource allocation only may be used).

Furthermore, the tokens are geographically restricted such that the provided right is only available within the associated geographical area. Accordingly, the system allows the tokens to control the geographic resource management and e.g. allows control of hot spot activity etc.

The geographic area associated with a token may in some scenarios correspond to a cell size/cell coverage area for one of the systems. However, in most embodiments or scenarios, the geographical coverage area is different than the cell sizes. For example, in some cases, the geographical area in which a token provides a resource right may be (much) smaller than the cell size thereby allowing specific radio resource control for small (e.g. critical hot spot) areas. In other examples, the geographical area for a token may be larger than a cell and may specifically cover a plurality of cells. This may allow a facilitated management of radio resource in a large area.

Figure 2:
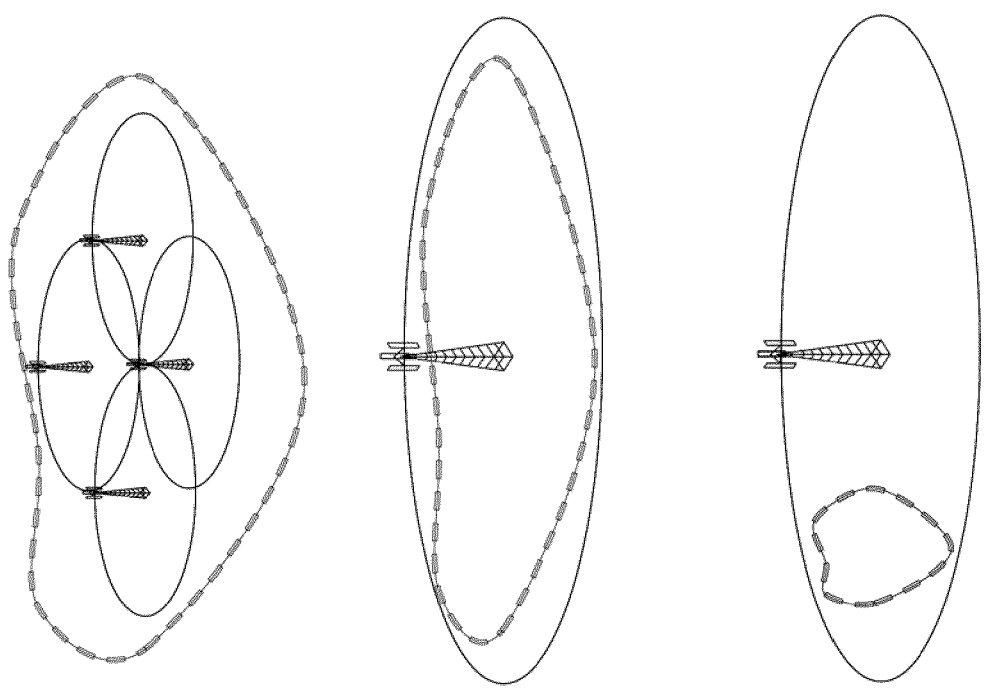
FIG. 2 illustrates examples of different geographical areas for resource right tokens relative to cell sizes in accordance with some embodiments of the invention.

Thus, an advantage of the described approach is that it provides for a very flexible management of geographic radio resource which is not constrained or affected by the specific cell layout of any of the communication systems. An example of different geographical areas relative to cell sizes is illustrated in FIG. 2.

In the example of FIG. 1, the first communication system 103 comprises a first token controller 117 which is arranged to transmit resource right tokens to the wireless communication units supported by the first communication system 103. Similarly, the second communication system 105 comprises a second token controller 119 which is arranged to transmit resource right tokens to the wireless communication units supported by the second communication system 105. For example, the first communication system 103 may comprise a batch of tokens giving rights to use a given radio resource of the second communication system 105 or to perform a handover to the second communication system 105. The batch of tokens (e.g. the rights that can be allocated to users of the first communication system 103) may be dynamically determined (e.g. by the higher level token controller 501) in communication with the second communication system 105. As another example, the operators of the first communication system 103 and the second communication system 105 may have agreed on which resource rights for the second communication system 105 may be provided to wireless communication units of the first communication system 103 (e.g. a maximum number of handovers to the second communication system 105 from the first communication system 103 for a given geographical area may have been agreed upon).

The first token controller 117 can allocate tokens from the batch to the wireless communication units currently active in the first communication system 103. However, if all tokens of the batch are allocated to wireless communication units, no more tokens can be allocated thereby ensuring that the radio resource usage is limited to the agreed level.

Thus, in the system, radio resource usage by a wireless communication unit at a given geographical location is controller by allocation of rights to the wireless communication units. The rights are allocated by tokens which are active within a given geographical area and can be managed dynamically to suit the current radio and network conditions.

Figure 3:
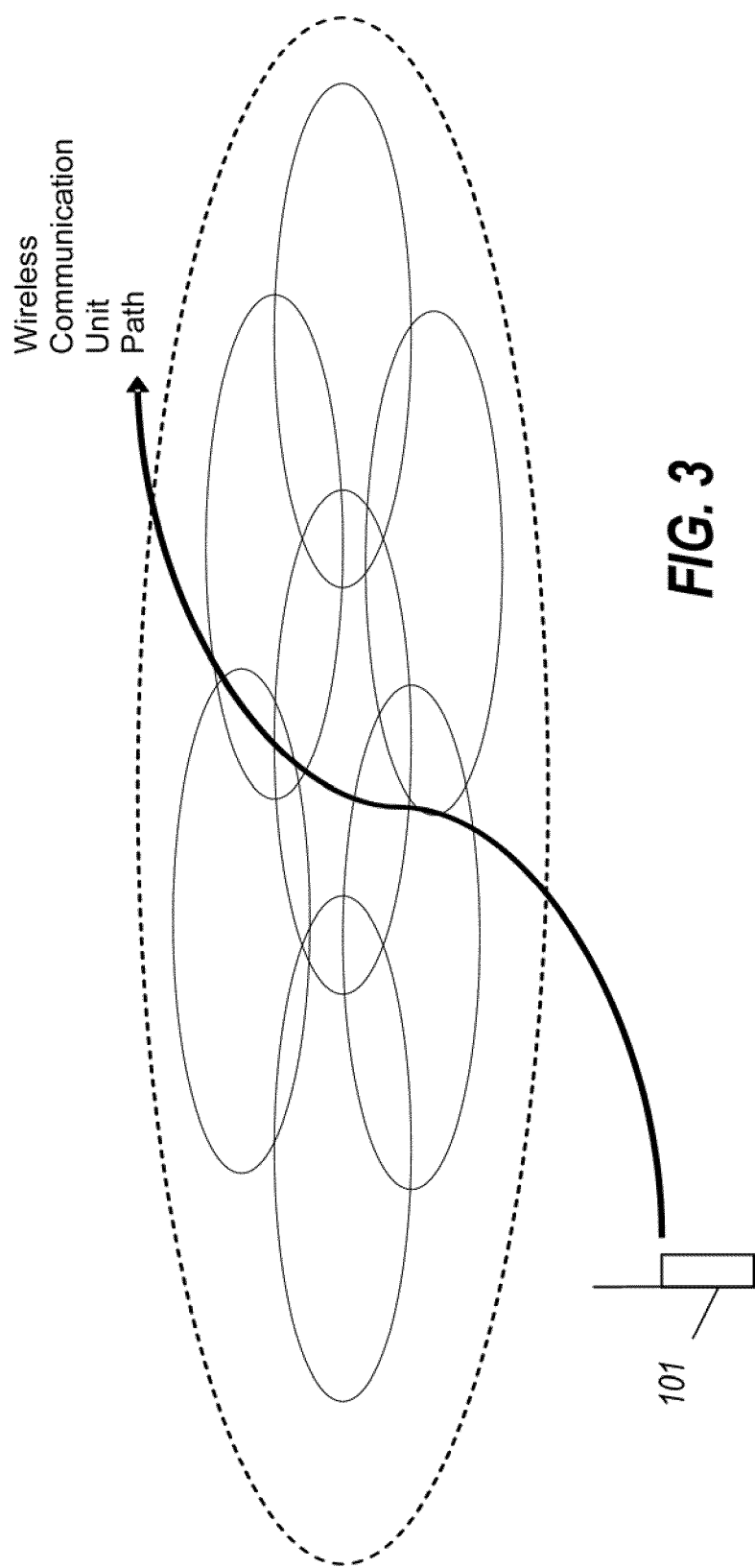
FIG. 3 illustrates an example of a path of a wireless communication unit through geographical areas.

As illustrated in FIG. 3, tokens may be associated with different geographical areas and specifically a given area may be divided into a number of token areas wherein radio resource usage within each token area is controlled by a batch of one or more tokens which may be allocated to wireless communication units entering the token area. For each token area, tokens may be allocated to the wireless communication units from the limited batch thereby ensuring that the radio resource usage of the wireless communication units within the area does not exceed the available tokens.

As a wireless communication unit, such as the first wireless device 101, moves it may thus move into and out of the different token areas. Within each token area the operation is (at least partially) controlled by the tokens associated with this geographical token area. A wireless communication unit may be allocated tokens for a plurality of token areas and as the wireless communication unit moves, the different allocated tokens thus become active depending on which token area the wireless communication unit is currently in.

The tokens may e.g. be allocated to the wireless communication unit dependent on the location of the wireless communication unit. For example, the first communication system 103 may comprise network based location estimation technology that can determine the current location of the first wireless device 101. It will be appreciated that many suitable algorithms for network based location estimation will be known to the person skilled in the art. If the first communication system 103 determines that the first wireless device 101 is entering a token area, it can inform the first token controller 117 which can proceed to determine if there are any available tokens and if so can download these to the first wireless device 101.

Thus, in such an embodiment, the first wireless device 101 may not be pre-allocated any tokens but is dynamically assigned temporary tokens when entering or approaching a given token area. The first wireless device 101 can then proceed to use the assigned rights as and when this is advantageous for the first wireless device 101. Upon exiting the token area, the first wireless device 101 may release the token so that this is free to be allocated to other wireless communication units. For example, the first wireless device 101 may detect from an internally generated location estimate that it has moved outside the token area and may accordingly transmit a suitable release message to the first token controller 117 via the first access point 107.

In some scenarios or embodiments, the tokens are allocated when the wireless communication units approach a given token area but before they actually enter it. For example, tokens for a group of token areas may be allocated before or whenever a wireless communication unit enters one of the token areas. As another example, a token for a first token area may be allocated whenever the wireless communication unit is within a certain distance of the token area.

In the above examples, the tokens may be dynamically allocated depending on the location of the wireless communication units. However, in some embodiments or scenarios, tokens may be allocated semi-permanently. For example, the first wireless device 101 may be allocated a number of tokens for specific token areas which it retains until it receives a token release message from the first token controller 117. Thus, the first wireless device 101 will retain the tokens independently of the location of the wireless communication unit and will thus have a semi-permanent right for the given token area associated with the assigned tokens. When the first wireless device 101 moves into the token area associated with the semi-permanently assigned token, the radio resource right will automatically be activated. The semi-permanent allocation may e.g. be for more than a day, a week or perhaps a month depending on the specific preferences and requirements of the individual embodiment.

In other examples, the token allocation may be a short term allocation and may for example be allocated for durations of less than an hour, such as e.g. for a few seconds and even for a few minutes.

It will be appreciated that a combination of dynamic and semi-permanent token allocations may be used in many embodiments. For example, a wireless communication unit may be permanently allocated a number of tokens for one or more token areas close to the user's home or work. In addition, the wireless communication unit may be dynamically allocated other tokens as and when it enters other token areas depending on whether these token areas have available tokens.

In some cases, one or more wireless communication units may be allocated a minimum radio resource right providing a minimum level of radio resource rights which are always available to the wireless communication unit within any token area. Specifically, a default token may be assigned to wireless communication units to provide such a minimum radio resource right. Such a default token can provide for basic set up of connections with no specific optimization requirements.

Figure 4:
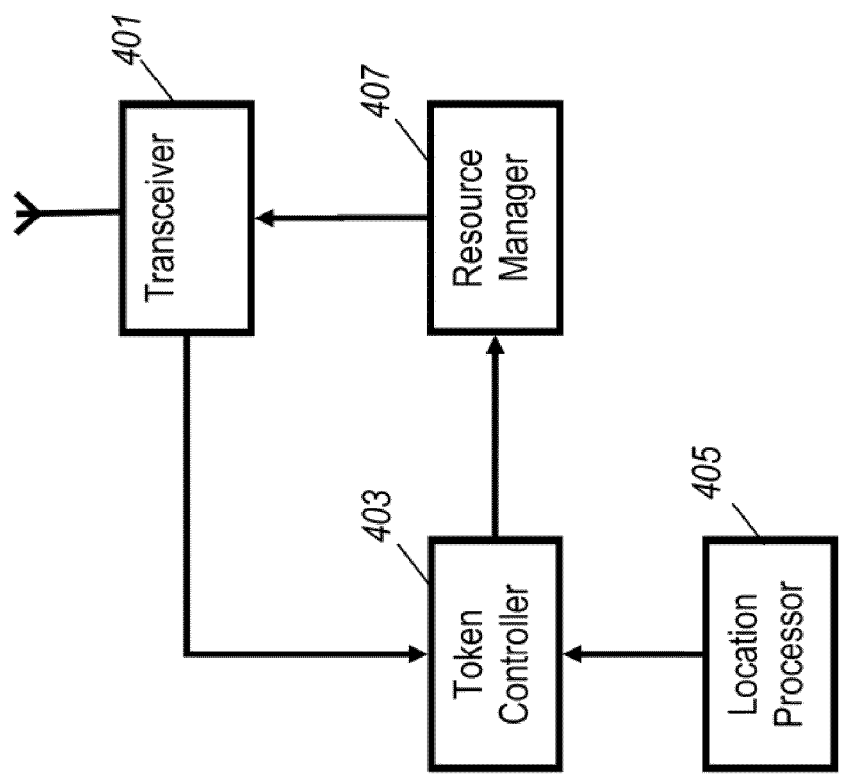
FIG. 4 illustrates an example of a wireless communication unit in accordance with some embodiments of the invention.

FIG. 4 illustrates elements of the first wireless device 101. It will be appreciated that FIG. 4 for brevity and clarity illustrates only elements necessary for the following description, and that the first wireless device 101 typically includes any additional functionality required for communication over the air interfaces of the first communication system 103 and the second communication system 105.

The first wireless device 101 comprises a transceiver 401 which is capable of communicating over the air interfaces of the first communication system 103 and second communication system 105 in accordance with the UMTS Technical Specifications and the appropriate WLAN Technical Specifications respectively.

The transceiver 401 is coupled to a device token controller 403 which is operable to receive any geographical radio resource tokens allocated to the first wireless device 101 by the first token controller 117 or the second token controller 119. Specifically, as described previously, the first token controller 117 or second token controller 119 may allocate tokens to the first wireless device 101 and transmit these to the first wireless device 101 using air interface communication. An allocation is specifically provided to the first wireless device 101 by transmitting a suitable token message to the first wireless device 101 identifying the token and the parameters thereof. The parameters of the token may e.g. specify characteristics, properties and/or aspects of the allocated right. The token messages are in the example transmitted to the first wireless device 101 over an air interface control channel of the appropriate communication system.

Each token may specifically include a definition (in terms of parameters) of the resource right which is provided by the allocation of the token. In addition, the token may define the geographical token area in which this right is provided, i.e. the token area in which the token becomes active.

In the example, the first wireless device 101 furthermore comprises a location processor 405 which is arranged to provide a location estimate for the first wireless device 101. Specifically, the first wireless device 101 can comprise a GPS receiver which generates an accurate location estimate. In other embodiments, the location estimate may e.g. be based on location estimation algorithms based on the communications within the communication system as will be known to the skilled person.

The location processor 405 continually (e.g. once per minute or faster) provides updated location estimates to the device token controller 403 which compares the current location estimate to the token area(s) defined for the token(s) that have been allocated to the first wireless device 101. If the device token controller 403 detects that the location estimate moves into one of the token areas for which a token has been allocated, the data identifying the allocated resource rights for this token area is fed to a radio resource manager 407 coupled to the device token controller 403.

The radio resource manager 407 is operable to determine a radio resource usage parameter in response to the radio resource right allocation for the token. Accordingly, the radio resource manager 407 only determines the radio resource usage parameter in response to the radio resource right allocation of the token if the location estimate is within the first geographical area. Thus, the approach allows the localised radio resource management performed by the first wireless device 101 to be remotely controlled and/or constrained by the operator(s) and to be optimised for the specific area. Furthermore, the use of tokens allocating resource rights rather than specific resource allocations allows the devices to individually perform radio resource management operations thereby providing a number of advantages associated with and known for distributed radio resource management.

As a specific example, a token allowing the first wireless device 101 to use a specific resource allocation of the second communication system 105 when in a given token area may be allocated to the first wireless device 101 while this is supported by the first communication system 103. When the first wireless device 101 enters the token area, the radio resource manager 407 may accordingly proceed to transmit using the allocated resource provided that the first wireless device 101 has an unfulfilled communication requirement. Otherwise, the resource will not be used by the first wireless device 101 and is free to be used by other wireless communication units.

As another example, the radio resource manager 407 may set a characteristic of the transmissions from the first wireless device 101 depending on the allocated resource right. For example, under normal operation the transmit power of a first wireless device 101 may be limited to, say, 20 dBm. However, a token may be allocated to some wireless communication units allowing them to transmit at a maximum power of 23 dBm. If the first wireless device 101 is allocated such a token, the radio resource management may provide the power control functionality with an indication of the allowed additional transmit power. The power control loop may accordingly allow the transmit power to increase to 23 dBm rather than 20 dBm if necessary.

The device token controller 403 may also compare the location estimate with the token area of all tokens which are currently active. If the device token controller 403 detects that the location estimate moves outside a token area of an active token, it may inform the radio resource manager 407 that the token is no longer active and thus that the associated resource right is no longer allocated. The radio resource manager 407 may accordingly change the radio resource management parameter, e.g. the maximum transmit power level may be reduced to 20 dBm.

In addition, the first wireless device 101 may continue to transmit a token release message to the first token controller 117 (or the second token controller 119 if appropriate). In addition, for dynamically allocated tokens, the first wireless device 101 may delete the token from the list of allocated tokens. The token release message will indicate to the first token controller 117 that the allocated token is no longer active at the first wireless device 101 and that it may be free to be allocated to other wireless communication units.

It will be appreciated that some tokens may not be released in this way. For example, the first wireless device 101 may release dynamically allocated tokens when the corresponding token area is exited but may continue to retain the allocation of semi-permanently allocated tokens.

FIG. 1 illustrates a first token controller 117 and a second token controller 119 in the first communication system 103 and the second communication system 105 respectively. In some embodiments, token controllers may be coupled together in a hierarchical arrangement wherein token controllers at a lower level may be managed together by a higher layer token controller.

Figure 5:
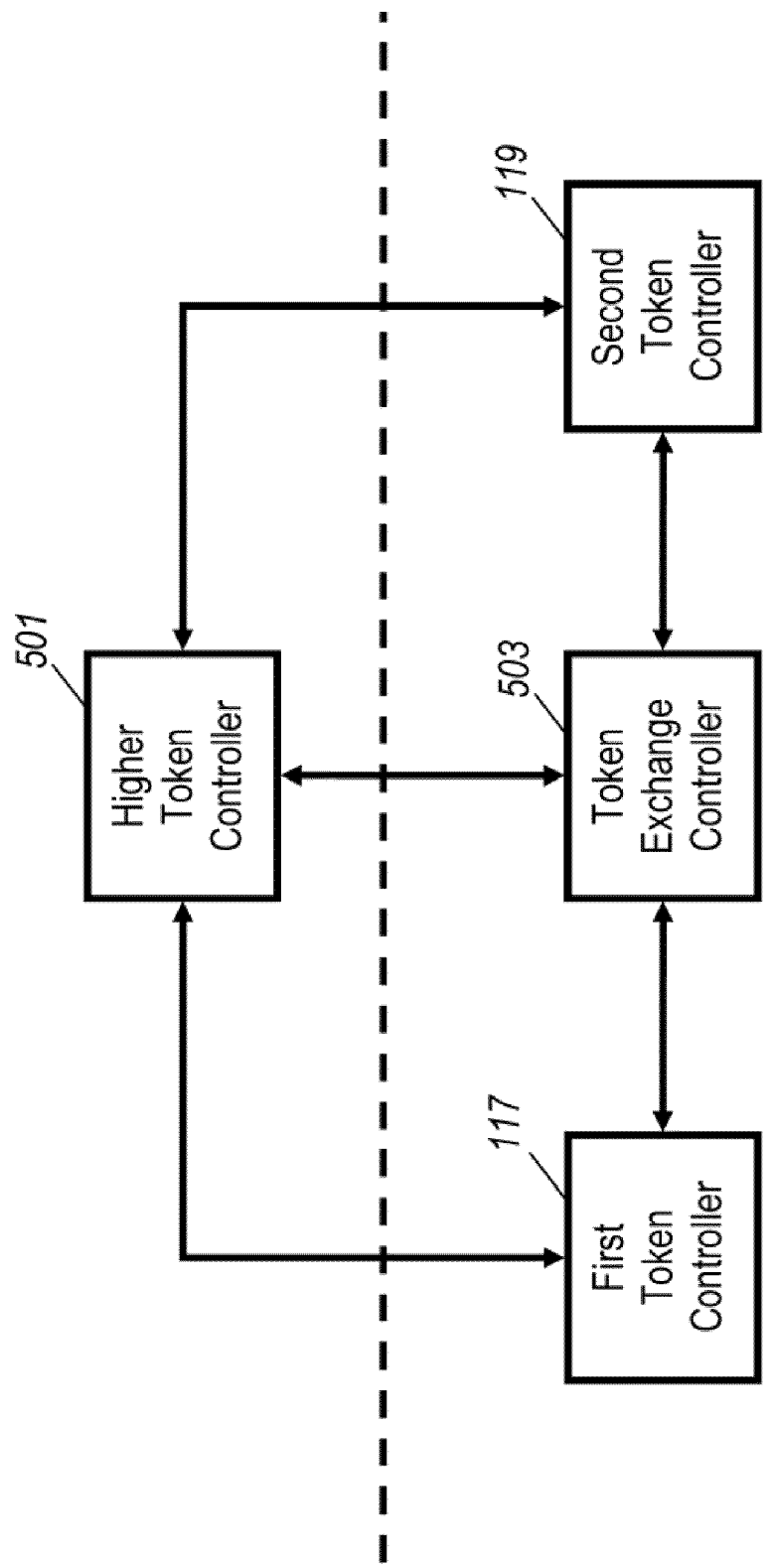
FIG. 5 illustrates an example of a hierarchical token controller arrangement in accordance with some embodiments of the invention.

An example of such a hierarchical arrangement compatible with FIG. 1 is shown in FIG. 5. In the example, the first token controller 117 and the second token controller 119 are coupled to a higher level token controller 501. The higher level token controller 501 is operable to allocate tokens to the lower level controllers, i.e. to the first token controller 117 and the second token controller 119. The lower level controllers 117, 119 can then allocate these tokens to the wireless communication units of the system.

In the example, the lower level controllers 117, 119 do not themselves generate tokens but can only allocate tokens that have been allocated to them by the higher level token controller 501. This may allow the higher level token controller 501 to control the interaction and interworking between the systems while allowing the systems themselves to manage the available resource rights.

For example, the first communication system 103 and the second communication system 105 may be operated by different network operators and the use of a token controller 117, 119 in each communication system may allow each operator to independently perform radio resource management. The higher level token controller 501 may be controlled by a regulator thereby allowing a regulator to control the independent operation of the individual operators. Specifically, the higher level token controller 501 may generate the batches of tokens that are available to each lower level controller 117, 119 thereby ensuring that only a pre-agreed resource right pool can be distributed by each system.

Specifically, the higher level token controller 501 may generate a set of template tokens for each of the lower level controllers 117, 119. The template tokens may comprise a number of parameters defining the associated resource right. Some, all or none of these parameters may be modified by the lower level controllers 117, 119. Specifically, the higher level token controller 501 may also include data which identifies the parameters that may be changed by the lower level controllers 117, 119 and possibly how these may be changed.

As a specific example, the higher level token controller 501 may for each token define some parameters to be fixed parameters that cannot be changed by the lower level controllers 117, 119. Thus, some parameters may be entirely set by the regulator without any option for the individual operator to change the parameter values. Other parameters may be modifiable parameters which can be set or modified by the lower level controllers 117, 119. Thus, these parameter values may be controlled by the individual operator. In some cases, the higher level token controller 501 may restrict the values which may be assigned to the modifiable parameters. For example, a maximum and minimum value for a modifiable parameter may be set by the higher level token controller 501.

In the arrangement of FIG. 5, the higher level token controller 501 may specifically be independent of the individual communication systems whereas the lower level controllers 117, 119 may support different radio access networks, e.g. radio access networks operating in accordance with different Technical Specifications or Standards. In the specific example, the first token controller 117 is part of a UMTS cellular communication system and is operated by a cellular system operator whereas the second token controller 119 is part of a WLAN system operated by a WLAN operator. In contrast, the higher level token controller 501 is not part of any specific communication system or dedicated to any specific radio access network. Rather, the higher level token controller 501 is independent of the individual communication systems and operators and is controlled by a Regulator.

In the example of FIG. 5, the first and second token controller 117, 119 are both coupled to a token exchange controller 503 which is operable to temporarily reallocate radio resource management rights from a first of the lower level controllers to a second of the lower level controllers. For example, the first token controller 117 can transmit a request to the token exchange controller 503 that a radio resource right to a specific resource element is temporarily allocated to the first communication system 103 from the second communication system 105. The token exchange controller 503 can then transmit this request to the second token controller 119 which may accept the reallocation of this radio resource right to the first communication system 103.

In some embodiments, the token exchange controller 503 may specifically be arranged to directly exchange resource right tokens between the lower level controllers 117, 119. Thus, the token exchange controller 503 may allow efficient real time token sharing between diverse communication systems (e.g. based on a trading scheme). In the example, the higher level token controller 501 is furthermore coupled to the token exchange controller 503. This may allow the higher level token controller 501 to monitor the resource right and/or token exchange between the lower level controllers 117, 119. In addition, it may allow the higher level token controller 501 to control this exchange and e.g. to specify characteristics or constraints that must be met by the resource right/token sharing. For example, the higher level token controller 501 may provide a set of rules that must be used for the trading and exchange of resource rights and/or tokens.

Thus, the higher level controller may be arranged to generate reallocation data indicating reallocation constraints for the reallocation of geographical radio resource rights/tokens between lower level controllers and to transmit the reallocation data to the reallocation means (the token exchange controller 503). The reallocation may be arranged to reallocate geographical radio resource rights and/or tokens between lower level controllers in response to the reallocation data.

An advantage of the described structure is that it allows practical, efficient and flexible resource right sharing between different operators of (sub-) communication systems of a heterogeneous communication system while providing efficient regulator control and visibility of this resource right sharing.

A set of possible token parameters that may be defined by the higher level token controller 501 are provided in the following table (it will be appreciated that the list is not exhaustive and that other parameters may be used in other scenarios and/or embodiments):

|  | Parameter Description | Fixed (F)/ Modifiable (M) | Range (if modifiable) |
|---|---|---|---|
| General Attributes | Dynamic Spectrum Access Right Token (Spectrum sharing, Indicative of a right of a wireless device of one communication system to use the resource of another communication system) | F | N/A |
|  | Inter Systems Hand Over right Token (Indicative of a right of a wireless device of one system to handover to another communication system) | F | N/A |
|  | Token time window activation allowance (Indicative of a time interval in which the right provided by the token may be used) | F | N/A |
|  | ... | ... | ... |
|  | ... | ... | ... |
| Dynamic Spectrum Access | Operating channels (time * frequency, chunk) (Specifies the parameters of a resource allocation of one communication system that may be used by a wireless device of another communication system) | ... | ... |
|  | Time window allowance (Indicative of a time interval in which the right provided by the token may be used) | ... | ... |
|  | Max transmit power (dBm) allowance (Indicative of the maximum transmit power that may be used by a wireless device assigned the token) | ... | ... |
|  | Inter base station resource renting area coordinates for negotiation between secondary systems (Indicative of a geographic area in which a base station allocated the token may negotiate with other base stations in order to temporarily exchange resource) | ... | ... |
|  | ... | ... | ... |
| Inter system Hand Over | Destination radio access technology allowance (Indicative of the radio access technologies that may be used by a wireless device being allocated the token) | ... | ... |
|  | Destination operator allowance (Indicative of the network operators from which a wireless device allocated the token may request resource) | ... | ... |
|  | Traffic load handover trigger criteria (Indicative of the conditions that must be met for a wireless device allocated the token to handover to another communication system) | ... | ... |
|  | ... | ... | ... |

In some embodiments, the parameters of a token allocated to a wireless communication unit may be dynamically updated while it is allocated. The updating may e.g. be for both active and non-active allocated tokens or may only be for one category.

The update of the parameters may for example be by the access points of one or more communication systems transmitting or broadcasting (or multicasting) new parameter values for the tokens.

As an example, the first token controller 117 may generate a dedicated message specifying a changed parameter value (such as e.g. a new constraint on the associated resource right) and transmit it to the specific wireless communication unit currently allocated the token. As another example, a broadcast control channel of the first communication system 103 may transmit a broadcast message indicating that a specific parameter value should be changed by all wireless communication units for all tokens comprising this parameter. For example, a message may be broadcast which indicates that the maximum transmit power parameter is increased (or decreased) by 3 dB, and in response all the wireless communication units having a token with a maximum transmit power right will increase this by 3 dB.

In the previously described example, the tokens are allocated by the first communication system 103 depending on the location of the wireless communication units and without these explicitly requesting tokens. In some embodiments, the wireless communication units may themselves request the allocation of one or more tokens by the first token controller 117. For example, the first communication system 103 and/or the second communication system 105 may transmit a control channel which comprises an indication that geographical radio resource tokens are used in a specific geographical area. In the specific example, the control channel may indicate all the token areas which are currently active in a given region and may further specify which resource rights can be assigned by tokens within these token areas.

The wireless communication unit can then compare its current location estimate to the token areas and can transmit a token request to the first token controller 117 if it detects that it enters one of the token areas (or moves within a given distance to the token area). In response to receiving the token request, the first token controller 117 may then decide to allocate a token or not. If a token is allocated (e.g. if the available batch or pool of tokens is currently not fully assigned) it is transmitted to the first wireless device 101. When the first wireless device 101 receives the requested token, it can proceed to use the associated radio resource right in the token area.

Figure 6:
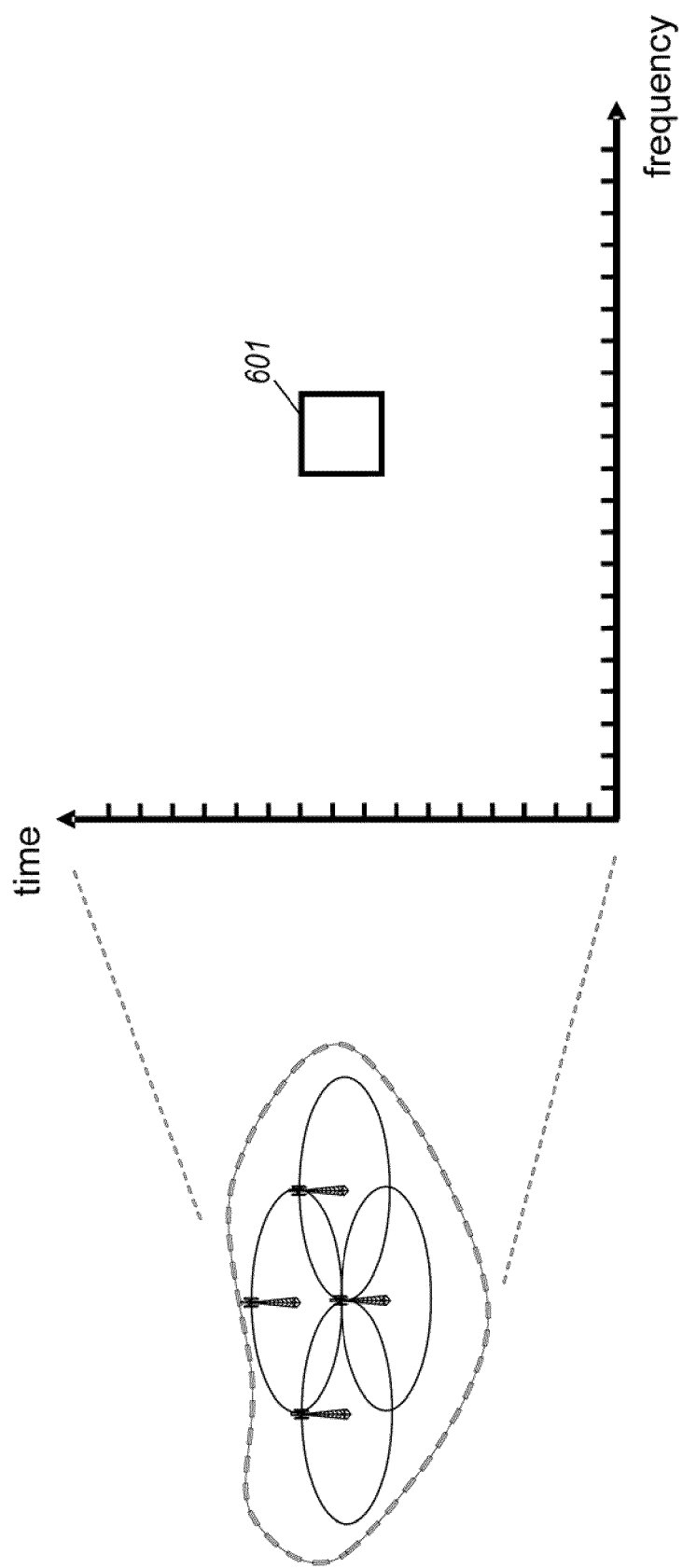
FIG. 6 illustrates an example of an allocation of resource rights using resource right tokens in accordance with some embodiments of the invention.

FIG. 6 illustrates an example of a specific resource right that may be allocated in a resource right token assigned to the first wireless device 101. In the example, resource right allocations to the second communication system 105 for a device of the first communication system 103 may be provided within a token area corresponding to a plurality of cells. Thus, a multi-mode terminal subscribing to the UMTS cellular communication system (the first communication system 103) may use a communication resource of the WLAN communication system within this token area if a suitable token for the token area has been assigned.

The radio resource right may be dynamically allocated to the first wireless device 101 by the first token controller 117 and may specify a given time frequency resource block that can be used by the first wireless device 101 (such as e.g. block 601). Thus, if the first wireless device 101 is within the token area during the assigned time interval, it may choose to request or use a WLAN resource within the specified frequency interval. However, the first wireless device 101 cannot use any resource if no token has been assigned or if it is outside the token area. Also, it cannot use any resource outside the specified time frequency allocation block.

Thus, in this example, dynamic spectrum access wherein a wireless communication unit of one communication system can opportunistically use a resource allocation of another communication system (e.g. in accordance with P.1900 principles and standards) can be controlled and managed while still allowing distributed decisions in the individual wireless communication units.

As another example, the resource right allocation can comprise a right to perform a handover and specifically to perform an intersystem handover. For example, within a geographical area, the first wireless device 101 may be allocated a token that allows it to initiate a handover from the first communication system 103 to the second communication system 105 if this appears advantageous to the first wireless device 101. The actual handover requests and procedures may follow the standard handover procedures for the involved communication systems 117, 119. Thus, the system allows existing localised radio resource management procedures to be used while allowing an overall centralized control and management of the overall radio resource performance. For example, the system may allow the total number of handovers from the first communication system 103 to the second communication system 105 within a given geographical area to be restricted to an acceptable number. Thus, the tokens can specifically be used to achieve efficient load balancing between cells and/or systems.

In this example, the purpose of the tokens usage is to optimize the existing radio resources already operated by the individual systems, so the described token based mechanisms may be introduced on the top of the existing radio resource mechanisms used by these different individual systems.

In the previous description the resource right tokens were allocated to wireless communication units that are mobile devices and/or belong to the user equipment, subscriber unit, remote terminal segment of the communication system. However, alternatively or additionally, the wireless communication units which are allocated resource right tokens may be wireless access points, such as a cellular base station or a WLAN access point.

For example, some systems may include support for resource sharing between different wireless access points. For example, wireless access points may negotiate with each other in order to temporarily reallocate some resource from one wireless access point to another. In the example, such resource reallocation or sharing may be subject to the radio resource rights assigned to the wireless access points by tokens. For example, a given wireless access point may only be allowed to initiate resource reallocation negotiation with another wireless access point if it has been allocated a token and the other wireless access point is within the geographical area in which the token is active.

Thus, a token controller may allocate a token to a wireless access point providing it with the right to share resource with other wireless access points which are within the geographical area defined for (and e.g. by) the received token. Such an approach may allow efficient control and management of the overall resource sharing performance while allowing the specific procedures used to achieve the resource sharing to be unchanged and/or managed locally in the individual wireless access points.

Figure 7:
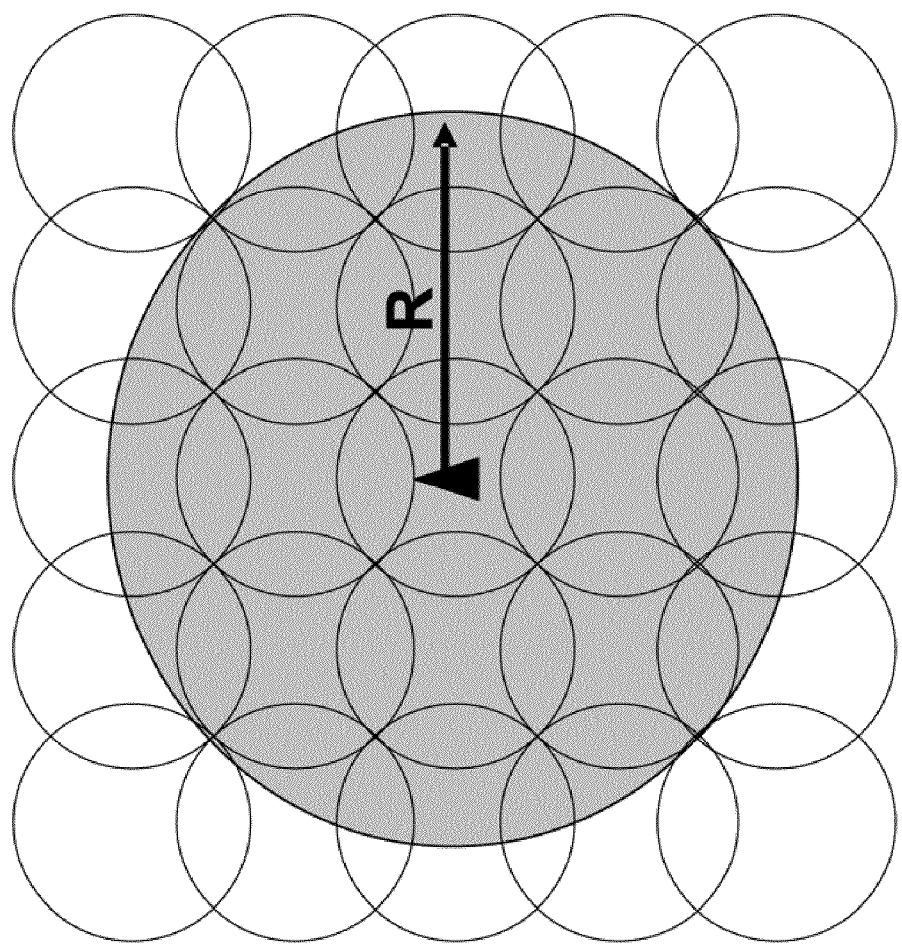
FIG. 7 illustrates an example of an allocation of resource rights using resource right tokens in accordance with some embodiments of the invention.

An example of a system wherein a token provides a right to negotiate resource sharing within a circular geographical area with a radius of R around a wireless access point is illustrated in FIG. 7.

Figure 8:
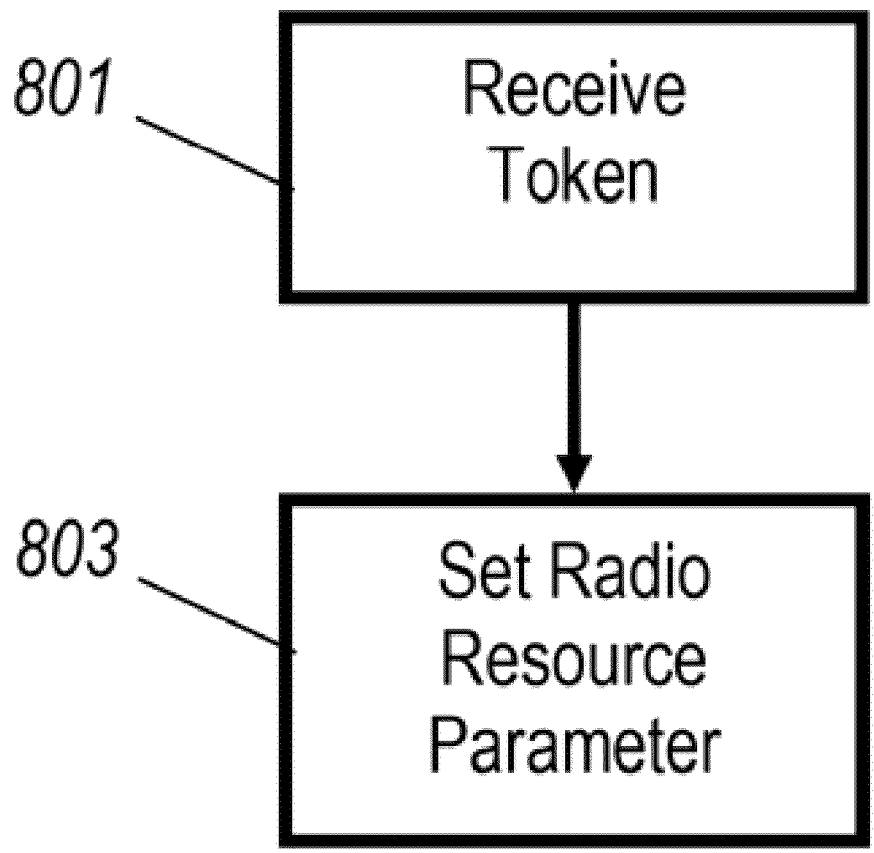
FIG. 8 illustrates an example of a method of radio resource management in accordance with some embodiments of the invention.

FIG. 8 illustrates an example of a method of radio resource management for a wireless communication unit for a radio communication system. The method initiates in step 801 wherein at least a first geographical radio resource token allocated to the wireless communication unit by a radio resource token controller of a network of the heterogeneous radio communication system is received. The first geographical radio resource token provides a first radio resource right allocation to the wireless communication unit for a first geographical area. Step 801 is followed by step 803 wherein a radio resource usage parameter is determined in response to the first radio resource right allocation.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A wireless communication unit for a radio communication system, the wireless communication unit comprising:
   a transceiver for receiving at least a first geographical radio resource token allocated to the wireless communication unit by a radio resource token controller of a network of the radio communication system, the first geographical radio resource token providing a first radio resource right allocation to the wireless communication unit for a first geographical area;
   a location processor for providing a location estimate for the wireless communication unit; and
   a radio resource manager for determining a radio resource usage parameter in response to the first radio resource right allocation only when the location estimate is within the first geographical area.

2. The wireless communication unit of claim 1 further comprising the transceiver for transmitting a token release indication for the first geographical radio resource token to the radio resource token controller in response to a detection that the location estimate has moved outside the first geographical area.

3. The wireless communication unit of claim 1 further comprising:
   the transceiver operable to:
   receive a control channel of the communication system, the control channel comprising an indication that geographical radio resource tokens are used in a second geographical area;
   transmit a token request to the radio resource token controller in response to a detection that the location estimate has entered within a first distance of the second geographical area; and
   receive the first geographical radio resource token from the token controller.

4. The wireless communication unit of claim 1 wherein the radio resource manager sets a transmit characteristic for transmissions of the wireless communication unit in response to the radio resource usage parameter.

5. The wireless communication unit of claim 1 wherein the radio resource usage parameter is a radio resource allocation; and the wireless communication unit is arranged to communicate using the radio resource allocation when the location estimate is within the first geographical area.

6. The wireless communication unit of claim 1 wherein the wireless communication unit is a wireless access point.

7. The wireless communication unit of claim 6 wherein the first geographical area identifies a set of access points allowable for temporary resource reallocation for the wireless communication unit; and the wireless communication unit is arranged to initiate a resource reallocation only with access points belonging to the set of access point.

8. The wireless communication unit of claim 1 wherein the first radio resource right allocation comprises a right to use a first resource allocation.

9. The wireless communication unit of claim 1 wherein the first radio resource right allocation comprises a right to perform a handover.

10. The wireless communication unit of claim 1 wherein radio communication system is a heterogeneous radio communication system comprising a plurality of sub-communication systems and the first radio resource right allocation comprises a radio resource right for a different sub-communication system than a sub-communication system currently supporting the wireless communication unit.

11. The wireless communication unit of claim 1 wherein the radio communication system further comprising a hierarchical token controller arrangement comprising a higher level token controller and a plurality of lower level token controllers, the radio resource token controller being a lower level token controller.

12. The wireless communication unit of claim 11, wherein
   the higher layer token controller is arranged to allocate geographical radio resource tokens to the plurality of lower level controllers; and
   each of the lower level controllers is arranged to allocate radio resource tokens received from the higher layer token controller to wireless communication units.

13. The radio communication system of claim 12 wherein the lower level controllers are arranged to only allocate geographical radio resource tokens which have been received from the higher layer controller to the wireless communication units.

14. The radio communication system of claim 12 wherein the lower level controllers are arranged to set a first radio resource right parameter of at least one geographical radio resource token.

15. The radio communication system of claim 14 wherein the higher layer controller is arranged to include modification data indicating modification rights for lower level controllers to modify parameters of the geographical radio resource tokens; and the lower level controllers are arranged to modify parameters of the geographical radio resource tokens in response to the modification data.

16. The radio communication system of claim 12 further comprising reallocation means for temporarily reallocating radio resource management rights from a first of the lower level controllers to a second of lower level controllers.

17. The radio communication system of claim 12 wherein the higher layer controller is arranged to support a plurality of lower layer controllers supporting different radio access networks.

18. The radio communication system of claim 12 wherein the radio communication system is a heterogeneous radio communication system.

19. A method of radio resource management for a wireless communication unit for a radio communication system, the method comprising:

receiving at least a first geographical radio resource token allocated to the wireless communication unit by a radio resource token controller of a network of the heterogeneous radio communication system, the first geographical radio resource token providing a first radio resource right allocation to the wireless communication unit for a first geographical area;

receiving a location estimate for the wireless communication unit by a location processor; and determining a radio resource usage parameter in response to the first radio resource right allocation only when the location estimate is within the first geographical area.

20. The method of claim 19, wherein the radio communication system further comprising a hierarchical token controller arrangement comprising a higher level token controller and a plurality of lower level token controllers, the radio resource token controller being a lower level token controller.

21. The method of claim 20, wherein the higher layer token controller is arranged to allocate geographical radio resource tokens to the plurality of lower level controllers; and each of the lower level controllers is arranged to allocate radio resource tokens received from the higher layer token controller to wireless communication units.

* * * * *

UNITED STATES PATENT AND TRADEMARK OFFICE
CERTIFICATE OF CORRECTION

PATENT NO. : 8,311,007 B2
APPLICATION NO. : 12/679337
DATED : November 13, 2012
INVENTOR(S) : Grandblaise et al.

Page 1 of 1

It is certified that error appears in the above-identified patent and that said Letters Patent is hereby corrected as shown below:

In the Specifications:

In Column 1, Lines 17-18, delete "(WMAN) and wireless" and insert -- (WMANs) and Wireless --, therefor.

In Column 4, Line 8, delete "Wireless" and insert -- Area --, therefor.

In Column 6, Lines 35-36, delete "controller" and insert -- controlled --, therefor.

Signed and Sealed this
Sixteenth Day of April, 2013

Teresa Stanek Rea
*Acting Director of the United States Patent and Trademark Office*